United States Patent [19]

Kato et al.

[11] Patent Number: 5,136,406
[45] Date of Patent: Aug. 4, 1992

[54] PLURAL LAYER LIQUID CRYSTAL DISPLAY DEVICE FOR A HIGH DENSITY DISPLAY

[75] Inventors: Kazunori Kato, Anjo; Yukiio Endo, Yokohama; Minoru Akatsuka, Yokohama; Masao Ohgawara, Yokohama; Kazutoshi Sawada, Nishinomiya, all of Japan

[73] Assignee: Asahi Glass Company Ltd., Tokyo, Japan

[21] Appl. No.: 364,439

[22] PCT Filed: Sep. 30, 1988

[86] PCT No.: PCT/JP88/01000
§ 371 Date: Jun. 6, 1989
§ 102(e) Date: Jun. 6, 1989

[87] PCT Pub. No.: WO89/03542
PCT Pub. Date: Apr. 20, 1989

[30] Foreign Application Priority Data

Oct. 6, 1987 [JP] Japan ................ 62-250636

[51] Int. Cl.$^5$ ............................. G02F 1/13
[52] U.S. Cl. .......................... 359/53; 359/63; 359/73; 359/93; 359/96
[58] Field of Search ........... 350/335, 339 F, 347 E, 350/349, 334, 337; 359/63, 73, 93, 96, 53

[56] References Cited

U.S. PATENT DOCUMENTS

| 4,405,210 | 9/1983 | Baur et al. ............... 350/345 |
| 4,443,065 | 4/1984 | Funada et al. ............ 350/335 |
| 4,460,248 | 7/1984 | Shirai .................... 350/335 |
| 4,508,427 | 4/1985 | Ross ...................... 350/335 |
| 4,556,286 | 12/1985 | Ichida et al. ............ 350/335 |
| 4,904,058 | 2/1990 | Kato et al. .............. 350/334 |
| 4,906,073 | 3/1990 | Hunahata et al. ......... 350/347 E |

FOREIGN PATENT DOCUMENTS

| 0246842 | 11/1987 | European Pat. Off. ........ 359/53 |
| 0284372 | 9/1988 | European Pat. Off. ........ 359/53 |
| 58-23013 | 2/1983 | Japan ..................... 350/347 E |
| 61-186927 | 8/1986 | Japan ..................... 350/335 |
| 62-134625 | 6/1987 | Japan ..................... 359/53 |
| 62-150329 | 7/1987 | Japan ..................... 350/335 |
| 62-153832 | 7/1987 | Japan ..................... 359/53 |
| 150019 | 2/1989 | Japan ..................... 350/339 F |
| 1131533 | 5/1989 | Japan ..................... 350/337 |
| 1137232 | 5/1989 | Japan ..................... 350/337 |
| 2092769 | 8/1982 | United Kingdom ............ 359/53 |
| 8203467 | 10/1982 | World Int. Prop. O. ....... 359/53 |

OTHER PUBLICATIONS

Kinugawa et al., "Highly Multiplexed STN-LCDs", SID 89 Digest, Section 22.3, pp. 386-389.
Patent Abstracts of Japan, vol. 11, No. 261 (P-609)(2708) Aug. 25, 1987, & JP, A. 62/066234 (Sharp Corp.) Mar. 25, 1987.
Patent Abstracts of Japan, vol. 11, No. 264 (P-610) (2711) Aug. 27, 1987, & JP, A. 62069233 (Matsushita Electric) Mar. 30, 1987.
ELECTRONICS, vol. 60, No. 11, May 28, 1987, T. Manuel: "Tektronix Builds a Brighter, Crispier LCD", pp. 61 and 62.
Applied Physics Letters, vol. 45, No. 10, Nov. 15, 1984, Am. Institute of Physics, T. J. Scheffer et al.: "A New, Highly Multiplexable Liquid Crystal Display", pp. 1021-1023, see p. 1022.
JEE-Journal of Electronic Engineering, vol. 24, No. 252, Dec. 1987 (Tokyo, Jp) H. Kuwagaki: "Sharp's White Mode LCD Comparable to CRT" pp. 68-71.

Primary Examiner—Rolf Hille
Assistant Examiner—Minhloan Tran
Attorney, Agent, or Firm—Oblon, Spivak, McClelland, Maier & Neustadt

[57] ABSTRACT

A plural layer liquid crystal display device for a high density display has a second liquid crystal layer containing dye and a dirst layer constructed such that the product $\Delta n_1 \cdot d_1$ of the anisotropy of refractive index $\Delta n_1$ of liquid molecules in the first liquid crystal layer and the thickness of the first liquid crystal layer $d_1$ is in a range of 0.7-2.0 $\mu$m. The foregoing arrangement provides a display close to a monochrome display with excellent viewing angle characteristics and a high contrast ratio.

14 Claims, 4 Drawing Sheets

FIGURE 4

PLURAL LAYER LIQUID CRYSTAL DISPLAY DEVICE FOR A HIGH DENSITY DISPLAY

TECHNICAL FIELD

The present invention relates to a liquid crystal display device for a high density display.

BACKGROUND TECHNOLOGY

A super twist element has been known to obtain a high density dot matrix display by increasing a twist angle of liquid crystal molecules between both electrodes to thereby cause an acute change in voltage-transmittance characteristic (T. J. Scheffer and J. Nehring, Appl., Phys., Lett. 45 (10) 1021-1023 (1984)).

In accordance with the above-mentioned technique, a value of the product $\Delta n \cdot d$ of the birefingence $\Delta n$ of liquid molecules in a liquid crystal display device and the thickness d of the liquid crystal layer is substantially within 0.8 $\mu$m-1.2 $\mu$m (Japanese Unexamined Patent Publication 10720/1985). Accordingly, a good contrast could not be obtained unless a specific combination in a display color such as yellowish green and dark blue, bluish purple and pale yellow and so on is used.

In the known-liquid crystal display device, it was impossible to obtain a multicolor display or a full color display by combining it with a microcolor filter because the conventional device could not effect a monochrome (black and white) display.

There is a proposed system to obtain a display close to a black and white display by determining the product $\Delta n \cdot d$ of the double refractive index of liquid crystal molecules and the thickness of the liquid crystal layer to be as small as nearly 0.6 $\mu$m by using a technique similar to the above-mentioned technique (M. Schadt et al. Appl. Phys. Lett. 50(5), 1987, p.236).

However, the proposed technique had such disadvantages that a display is dark; the greatest contrast ratio is not large and the display has a bluish color so that clearness in display is poor.

DISCLOSURE OF THE INVENTION

It is an object of the present invention to provide a liquid crystal display device capable of realizing a display close to a monochrome display, excellent viewing angle characteristics and a high contrast ratio.

It is another object of the present invention to provide a liquid crystal display device capable of realizing the same monocolor, multicolor or full color display as that effected by a conventional 90° twisted nematic (TN) device by forming a fine color filter inside or outside the cell.

The foregoing and the other objects of the present invention have been attained by providing a liquid crystal display device comprising a first liquid crystal layer of a nematic liquid crystal having positive dielectric anisotropy and including a chiral material which is interposed between a pair of substrates each having an aligning layer which are arranged substantially in parallel, a voltage applying means to apply a voltage across transparent electrodes of the pair of substrates which interpose the first liquid crystal layer therebetween, a second liquid crystal layer of a nematic liquid crystal including a chiral material which is interposed between another pair of substrates each having an aligning layer, the second liquid crystal layer being adjacent to the first liquid crystal layer, and a pair of polarizing plates arranged outside the first and second liquid crystal layers, characterized in that the second liquid crystal layer contains dye; the product $\Delta n_1 \cdot d_1$ of the anisotropy of refractive index $\Delta n_l$ of liquid molecules in the first liquid crystal layer and the thickness of the first liquid crystal layer $d_1$ is in a range of 0.7-2.0 $\mu$m; the axial direction of liquid crystal molecules of the first liquid crystal layer in an area close to the second liquid crystal layer is crossed at substantially a right angle to the axial direction of liquid crystal molecules of the second liquid crystal layer in an area close to the first liquid crystal layer; the twist angle of the liquid crystal molecules in the first liquid crystal layer is in a range of 200°-300°; the twist angle of the liquid crystal molecules in the second liquid crystal layer is substantially the same as the first liquid crystal layer but the helical sense is opposite; and an angle of intersection of the polarization axes of the pair of polarizing plates arranged outside the two liquid crystal layers is in a range of 60°-120°.

In the present invention, double liquid crystal layers are used. A first liquid crystal cell constituting a first liquid crystal layer has the same construction as the liquid crystal cell of a conventional super twist liquid crystal display device in which electrodes are arranged facing each other to thereby control on-off operations for each dot. The twist angle of the first liquid crystal layer is in a range of about 200°-300°. Specifically, a nematic liquid crystal including a chiral material and having positive dielectric anisotropy is interposed between a pair of substrates each having a transparent electrode arranged substantially in parallel with each other and the twist angle of the liquid crystal molecules is determined to be in a range of 200°-300° between the both electrodes.

In the present invention, a second liquid crystal layer is superposed on the first liquid crystal layer. The second liquid crystal layer has substantially the same twist angle as the first liquid crystal layer but has the opposite helical sense. The second liquid crystal layer may be a nematic liquid crystal layer containing dye for color compensation. A coloring matter capable of absorbing color ranging yellowish green to yellow, particularly having absorbing properties to a wavelength region of around 500 nm or longer is preferably used in an amount of about 0.1-5 wt%. Electrodes may be formed on the substrates at both sides of the second liquid crystal layer. The first liquid crystal layer may be provided at the front side with respect to a viewer, or the second liquid crystal layer may be disposed at the front side with respect to the viewer. When the first liquid crystal layer is arranged toward the viewer, there may cause disadvantages that a change in the thickness of the first liquid crystal layer caused when the viewer touches the liquid crystal display, whereby a display is colored, or there may cause a short circuit between the transparent electrodes on the substrates interposing the first liquid crystal layer therebetween. Accordingly, it is preferable that the second liquid crystal layer is arranged o the side of the viewer.

The axial direction of the liquid crystal molecules in the vicinity of the both liquid crystal layers is arranged so that they cross at substantially a right angle. Namely, the axial direction of the liquid crystal molecules in the first liquid crystal layer in the vicinity of the second liquid crystal layer is determined to be substantially perpendicular to the axial direction of the liquid crystal molecules in the second liquid crystal layer in the vicinity of the first liquid crystal layer. Specifically, when two liquid crystal layers are constituted by using three substrates, the aligning directions of the middle substrate are perpendicular at its both surfaces. When four substrates are used, the aligning direction of the two substrates at the middle portion in the laminated structure are determined to be perpendicular.

The nematic liquid crystal used for the second liquid crystal layer may not have the positive dielectric anisotropy because it is unnecessary to control electrically the orientation direction of the molecules when the electrodes are not provided o the substrates interposing therebetween the second liquid crystal layer. When a voltage is applied to the electrodes formed on the substrates interposing therebetween the second liquid crystal layer in use of the liquid crystal display device, the nematic liquid crystal having the positive dielectric anisotropy is used for the second liquid crystal layer.

In the present invention, the product $\Delta n \cdot d$ of the anisotropy of refractive index ($\Delta n$) of the liquid crystal in the first and second liquid crystal layers and the thickness of the liquid crystal layers is determined as follows.

The product $\Delta n_1 \cdot d_1$ in the first liquid crystal layer is determined to be in a range of 0.7 μm–2.0 μm. When the value of the product is less than 0.7 μm, a sufficient range of viewing angle which does not cause the negative/positive inversion of a display can not be obtained. On the other hand, when it exceeds 2.0 μm, a sufficient compensation can not be obtained even by the absorbing effect of a coloring matter contained in the second liquid crystal layer. In this case, some yellow tone remains and a sufficient transmittance can not be obtained.

Especially, for severe demands of providing a broad viewing angle and non-coloring in a display color, it is preferable that the product $\Delta n_1 \cdot d$ of the first liquid crystal layer is in a range of 0.8 μm–1.5 μm.

The product of $\Delta n_1 \cdot d_1$ should be satisfied in an allowable range of temperature when the liquid crystal display device, whereby a beautiful display is obtained. However, there is a possibility that the above-mentioned relation is satisfied in only an applicable temperature range due to requirements of another factor. In this case, when the temperature range of $\Delta n_1 \cdot d_1$ is outside the above-mentioned, a display may be colored or the viewing angle characteristics may be reduced.

In the second liquid crystal layer, the product $\Delta n_2 \cdot d_2 \cdot \cos^2(\theta x_2)$ of a value $\Delta n_2 \cdot d_2$ (which is the product of the anisotropy of refractive index of the second liquid crystal layer $\Delta n_2$ and the thickness of the second liquid crystal layer $d_2$) and a value $\cos^2(\theta x_2)$ (which is the second power of a cosine of $\theta x_2$ which is the mean value in the direction of thickness of second liquid crystal layer of an average tilt angle $\theta_2$ of the liquid crystal molecules to a plane in parallel to the second liquid crystal layer when the device is used) is made substantially equal to the product $\Delta n_1 \cdot d_1 \cdot \cos^2(\theta x_1)$ of a value $\Delta n_1 \cdot d_1$ (which is the product of anisotropy of refractive index of the first liquid crystal layer $\Delta n_1$ and the thickness of the first liquid crystal layer $d_1$) and a value $\cos^2(\theta x_1)$ (which is the second power of a cosine of $\theta x_1$ which is the mean value in the direction of thickness of the first liquid crystal layer of an average tilt angle $\theta$ of the liquid crystal molecules to a plane in parallel to the first liquid crystal layer when a non-selected voltage or a selected voltage is applied to the first liquid crystal layer at the time of multiplexing driving. Namely, $$\Delta n_2 \cdot d_2 \approx \Delta n_1 \cdot d_1 \times \frac{\cos^2(\theta x_1)}{\cos^2(\theta x_2)} \quad (1)$$

Namely, when the product $\Delta n_2 \cdot d_2$ is made substantially equal to a condition obtained by applying a non-selected voltage to the first liquid crystal layer at the time of multiplexing driving, the following equation (2) is satisfied wherein $\theta_{11}$ is an average tilt angle of the liquid crystal molecules in the first liquid crystal layer in the direction of thickness of the liquid crystal layer:

$$\Delta n_2 \cdot d_2 \approx \Delta n_1 \cdot d_1 \times \frac{\cos^2(\theta_{11})}{\cos^2(\theta x_2)} \quad (2)$$

When the condition of the equation (2) is satisfied, light transmits through a selected voltage applying area in the first liquid crystal layer to give white tone, and the other portion has a black tone; this provides a so-called negative display.

When the product $\Delta n_2 \cdot d_2$ is made substantially equal to a condition obtained by applying a selected voltage to the first liquid crystal layer at the time of multiplexing driving, the following equation (3) is satisfied:

$$\Delta n_2 \cdot d_2 = \Delta n_1 \cdot d_1 \times \frac{\cos^2(\theta_{21})}{\cos^2(\theta x_2)} \quad (3)$$

wherein $\theta_{21}$ is an average tilt angle of the liquid crystal molecules in the first liquid crystal layer in the direction of thickness of the liquid crystal layer. When the condition of the equation (3) is satisfied, a selected voltage applying portion in the first liquid crystal layer of the liquid crystal display device becomes black, and light transmits through the other portion to give a white tone; this provides a so-called positive display.

When a liquid crystal display device of a type that a voltage is not applied to the second liquid crystal layer is used, the liquid crystal molecules in the second liquid crystal layer lie substantially in horizontal direction. Accordingly, it is sufficient that the value $\Delta n_2 \cdot d_2$ of the second liquid crystal layer is made substantially equal to the value $\Delta n_1 \cdot d_1 \cdot \cos^2(\theta x_1)$. Namely, in the negative display type device, it is sufficient that the value $\Delta n_2 \cdot d_2$ of the second liquid crystal layer is substantially equal to the value $\Delta n_1 \cdot d_1 \cdot \cos^2(\theta_{11})$. Specifically, when the value $\Delta n_1 \cdot d_1$ is in a range of 0.7 m–2.0 vm and if the first liquid crystal layer is driven at a duty of 1/600 or less, it is desirable to reduce the value $\Delta n_2 \cdot d_2$ of the second liquid crystal layer to be 1%–20% smaller than the value $\Delta n_1 \cdot d_1$ of the first liquid crystal layer in order to obtain a display device having good quality of display. It is especially desirable that the value $\Delta n_2 \cdot d_2$ of the second liquid crystal layer is 3%–15% smaller than the value $\Delta n_1 \cdot d_1$ of the first liquid crystal layer.

On the other hand, when a liquid crystal display device of positive display type is used, it is sufficient that the value $\Delta n_2 \cdot d_2$ of the second liquid crystal layer is made substantially equal to the value $\Delta n_1 \cdot d_1 \cdot \cos^2(\theta_{21})$ of the first liquid crystal layer. Specifically, when the value $\Delta n_1 \cdot d_1$ is in a range of 0.7 μm–2.0 μm and if the first liquid crystal layer is driven at a duty of 1/600 or less, it is desirable that the value $\Delta n_2 \cdot d_2$ of the second liquid crystal layer is 25%–90% smaller than the value $\Delta n_1 \cdot d_1$ of the first liquid crystal layer to obtain a display device having good quality of display. It is especially desirable that the value $\Delta n_2 \cdot d_2$ of the second liquid crystal layer is 30%–75% smaller than the value $\Delta n_1 \cdot d_1$ of the first liquid crystal layer.

In the present invention, it is possible to use the liquid crystal display device of a type that a voltage is applied to the second liquid crystal layer when the device is used. In this case, it is necessary to use a nematic liquid crystal having positive dielectric anisotropy for the second liquid crystal layer. Further, it is necessary that the value $\Delta n_2 \cdot d_2$ of the second liquid crystal layer is greater than the value $\Delta n_1 \cdot d_1 \cdot \cos^2(\theta x_1)$ of the first liquid crystal layer when no voltage is applied. For the purpose of the applying to the voltage to the second liquid crystal layer, transparent electrodes are formed on each surface in contact with second liquid crystal layer of the upper and lower substrates which interpose the second liquid crystal layer, and means for applying a voltage across the transparent electrode is provided.

When the voltage is applied across the transparent electrodes at both sides of the second liquid crystal layer, liquid crystal molecules in the second liquid crystal layer are raised to some extent. A non-selected voltage at the time of multiplexing driving or a selected voltage is normally applied because the non-selected voltage or the selected voltage used for driving the first liquid crystal layer is easily available for the second liquid crystal layer. However, another power source may be used as long as a desired tilt angle of the liquid crystal molecules can be obtained.

Thus, by applying non-selected voltage or the selected voltage to the liquid crystal molecules in the second liquid crystal layer, an tilt angle $\theta_2$ of the molecules to a plane in parallel to the liquid crystal layer is obtainable.

To effect a positive display, it is enough that the product $\Delta n_2 \cdot d_2 \cdot \cos^2(\theta x_2)$ of the value $\Delta n_2 \cdot d_2$ of the second liquid crystal layer and the value $\cos^2(\theta x_2)$ which is the second power of a cosine of the average value $\theta x_2$ (as defined before) is made substantially equal to the product $\Delta n_1 \cdot d_1 \cdot \cos^2(\theta_{21})$ of the first liquid crystal layer (as defined before) at the time of applying the selected voltage. As a result, when a selected voltage is applied to the first liquid crystal layer, linearly polarized light, which enters perpendicularly into the liquid crystal display device, can be observed as completely linearly polarized light regardless of the wavelength even after passing through the first and second liquid crystal layers. Accordingly, the transmittance of light can be substantially zero by arranging the polarizing plate at the viewer's side so as to be substantially perpendicular to the polarization direction of the transmitting light. In this case, the light absorbing characteristics of dye mixed in the second liquid crystal layer show a little effect because the transmittance itself is very small.

On the other hand, when a non-selected voltage is applied to the first liquid crystal layer, the condition concerning the above-mentioned relation of the value $\Delta n_1 \cdot d_1 \cdot \cos^2(\theta x_1)$ is broken, whereby the transmitting light is polarized to be an elliptically polarized light in which the direction of the main axis changes depending on the wavelength. In this case, a transmitting light is observed.

When the dye is not contained in the second liquid crystal layer, the transmitting light shows a color having a yellow tone. However, the compensation of color can be made so as to give a color close to white by incorporating a suitable amount of dye capable of absorbing yellow, preferably capable of absorbing spectra in a long wavelength range longer than 500 nm. In other words, an amount of dye is controlled so that a displayed color approaches white as possible.

When an additional illuminating means is used, a color is compensated in consideration of a color temperature of illumination so that a color such as bluish white may be produced rather than true white.

Thus, by reducing the light transmittance to be nearly zero at the time of application of the selected voltage and by passing light at the time of application of the non-selected voltage, it is possible to obtain a positive type liquid crystal display device having a high contrast ratio. Further, a monochrome display can be obtained by arranging the polarization axes of a pair of polarizing plates in such direction that the transmitting light is effectively non-colored (while the polarization axes of the pair of polarization plates are in a ralation of crossing at a substantially right angle) when the non-selected voltage is applied to the first liquid crystal layer since the above-mentioned relation is satisfied by crossing the polarization axes of the pair of polarizing plates at substantially a right angle. When a liquid crystal display device of negative display type is used, it is enough that the product $\Delta n_2 \cdot d_2 \cdot \cos^2(\theta x_2)$ of the value $\Delta n_2 \cdot d_2$ of the second liquid crystal layer and the value $\cos^2(\theta x_2)$ which is the second power of a cosine of the mean value $\theta x_2$ of a tilt angle $\theta_2$ of the liquid crystal molecules of the second liquid crystal layer to a plane in parallel to the liquid crystal layer in the direction of the thickness of the layer is made substantially equal to the value $\Delta n_1 \cdot d_1 \cdot \cos^2(\theta_{11})$ of the first liquid crystal layer when a non-selected voltage is applied to the layer.

The twist angle of the first liquid crystal layer is in a range of about 200°–300° since a high contrast can not be obtained at the time of multiplexing driving under a high duty condition when the twist angle is smaller than 200°, and a domain is easily produced when it exceeds 300°.

The twist angle of the second liquid crystal layer is substantially the same as the twist angle of the first liquid crystal layer but the helical sense is opposite. However, when the difference of twist angle between the first and second liquid crystal layers is within about ±20°, the same effect can be obtained without a special modification.

When there is a difference between the twist angle of the first liquid crystal layer and the twist angle of the second liquid crystal layer, it is possible to obtain a display close to a monochrome display by adjusting the value $\Delta n \cdot d$, an angle of intersection in the aligning direction of both surfaces of the middle substrate or substrates, the kind and the concentration of a coloring matter, an angle of intersection between the polarization axes of the polarizing plates and other factors. More specifically, when the twist angle of the first liquid crystal layer is made small, the value $\Delta n_2 \cdot d_2$ of the second liquid crystal layer should be slightly large. On the contrary, when the twist angle of the second liquid crystal layer is made large, the value $\Delta n_2 \cdot d_2$ of the second liquid crystal layer should be slightly small. Further, a monochrome display having a contrast close to the present invention can be obtained by providing the optimum condition by, for instance, displacing the angle of intersection of the aligning direction of the both surfaces of the middle substrate from a right angle, or by changing the kind and the concentration of dye, or by displacing the angle of the polarization axes of the polarizing plates from the right angle.

Further, the temperature dependency of the anisotropy of refractive index (Δn) of the liquid crystal molecules in the first and second liquid crystal layers is made equal by substantially equalizing the nematic-isotropy phase transition temperature ($T_{NI}$) of the liquid crystal molecules in the first and second liquid crystal layers. In this case, a monochrome display having a high contrast ratio can be obtained in a broad temperature range.

Two liquid crystal layers used for the present invention may be prepared by using four substrates wherein each of the liquid crystal layers are respectively interposed between separate pairs of substrates to thereby form two sets of liquid crystal cells, followed by stacking them, or may be prepared by using three substrates by which two liquid crystal layers are interposed.

In the present invention, the second liquid crystal layer may not be provided with electrodes. However, when the electrodes are to be formed, it is sufficient to use sheet-like electrodes which unnecessitate position-adjusting, whereby two liquid crystal layers can be easily formed by using three substrates.

In the present invention, a pair of polarizing plates are disposed outside the stacked two liquid crystal layers.

When the polarization axes of the pair of polarazing plates are arranged so as to be substantially at right angle, the optimum bonding angle depends on the values Δn·d of the first and second liquid crystal layers and the values related thereto. In practice, the angle of intersection of the polarization axes can be changed in a range of 60°–120° to seek the optimum value. It is preferable to arrange the polarization axes of the polarizing plates so as to close to a right angle if values of the product of the value Δn·d and the value $\cos^2(\theta x)$ of the first and second liquid crystal layers do not agree with each other. In this case, a display close to a monochrome tone and having a high contrast ratio can be obtained.

It is preferably to displace the direction of the polarization axis of the polarizing plate disposed at the viewer's side by an angle of 30°–60° with respect to the axial direction of the liquid crystal molecules closest to the viewer. Particularly, an angle of displacement of 35°–55° is more preferable. For the other polarizing plate, it is preferable to arrange it so as to form an angle of intersection of 60°–120° between the polarization axes of the two polarazing plates. It is most preferable that the polarization axes of the two polarizing plates are crossed at substantially a right angle if values of the product of the value Δn·d and the value $\cos^2(\theta x)$ of the first and second liquid crystal layers are substantially equal. It is because when the angle of displacement between the direction of the polarization axis of the polarizing plate at the viewer's side and the axial direction of the liquid crystal molecules is smaller than 30°, or such angle exceeds 60°, a sufficient light transmittance can not be obtained in a segment applied with a non-selected voltage, and only dark display is effected as a whole.

In this case, yellow tone is dominant in a display color to thereby cause difficulty in compensating color by using dye, or to cause bluish tone which unables to render a display to be colorless.

To eliminate the above-mentioned disadvantage, it is desirable to displace the direction of the polarization axis of the polarizing plate placed at the viewer's side by an angle of 30°–60° with respect to the axial direction of the liquid crystal molecules closest to the viewer.

BEST MODE TO PRACTICE THE INVENTION

Figure 1:
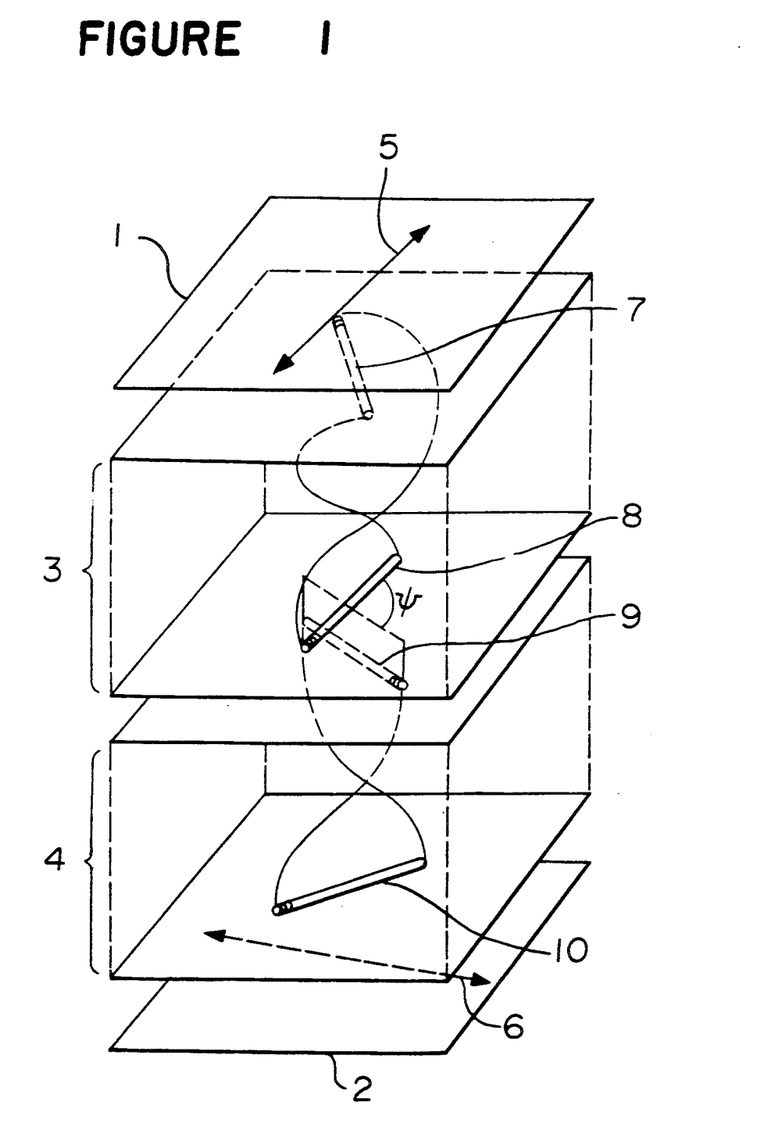
FIG. 1 is a perspective view schematically showing an embodiment of the liquid crystal display device according to the present invention.
Figure 2A:
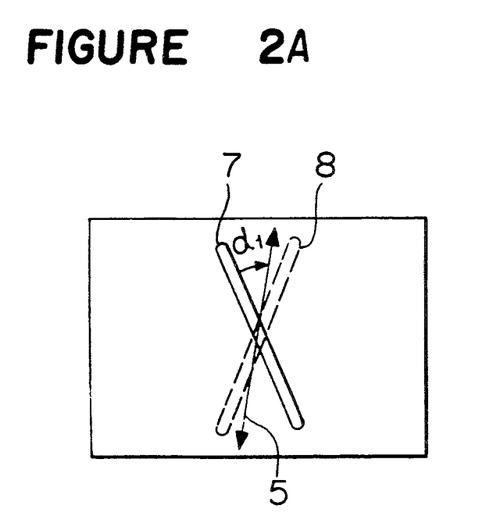
FIGS. 2A and 2B are respectively plane views in which a relative position of the polarization axis of a polarizing plate which is placed adjacent to a second liquid crystal cell to the direction of the liquid crystal molecules in the first liquid crystal cell placed at the upper position when viewed from the upper side or a second liquid crystal cell placed at the lower position when viewed from the upper side.
Figure 2B:
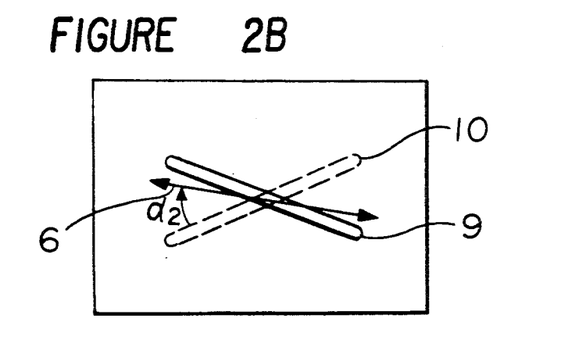

Preferred embodiments of the present invention will be described with reference to the drawings. FIGS. 1 and 2 show arrangements of the axial direction of liquid crystal molecules in a liquid crystal display device and the direction of the polarization axis of a polarizing plate when no voltage is applied.

In FIGS. 1 and 2, reference numerals 1 and 2 designate top and bottom polarizing plates, a numeral 3 designates a second liquid crystal cell which may be or may not be provided with sheet-like electrodes to apply a voltage to the entire part of the liquid crystal cell, a numeral 4 designates a first liquid Crystal cell to display characters and so on by application of a voltage, a numeral 5 designates the polarization axis of the upper polarizing plate 1, a numeral 6 designates the polarization axis of the lower polarizing plate 2, a numeral 7 designates the axial direction of liquid crystal molecules in the upper part of the second liquid crystal cell, a numeral 8 designates the axial direction of liquid crystal molecules in the lower part of the second liquid crystal cell, a numeral 9 designates the axial direction of liquid crystal molecules in the upper part of the first liquid crystal cell and a numeral 10 designates the axial direction of liquid crystal molecules in the lower part of the first liquid crystal cell.

In the present invention, the axial directions of the liquid crystal molecules in the adjoining parts of the both liquid crystal cells are crossed at substantially a right angle. Namely, an angle ψ formed by the axial direction 8 of the liquid crystal molecules in the lower part of the second liquid crystal cell and the axial direction 9 of the liquid crystal molecules in the upper part of the first liquid crystal cell is about 90°.

As disclosed in this embodiment, it is preferable that the polarization axes 5, 6 of the pair of polarizing plates intersect at substantially a right angle. In this case, the polarization axis 5 of the upper polarizing plate 1 is arranged to form an angle $\alpha_1$ of about 40° in the clockwise direction with respect to the axial direction of the liquid crystal molecules closest to a viewer, i.e. the direction of axis 7 of the liquid crystal molecules in the upper part of the second liquid crystal cell 3, and the direction of the polarization axis 6 of the lower polarizing plate 2 is arranged to form a right angle with respect to the polarization axis 5 of the upper polarizing plate 1. Namely, the polarization axis 6 of the lower polarizing plate 2 is displaced by an angle $\alpha_2$ of about 40° in the clockwise direction with respect to the axial direction 10 of the liquid crystal molecules which are most remote from the viewer. In this embodiment of the present invention, it is preferable that the angles $\alpha_1$ and $\alpha_2$ are respectively in a range of $\pm 30°$-$60°$.

In the present invention, the first and second liquid crystal layers are arranged so as to satisfy the equation (1), whereby the liquid crystal display device provides a monochrome display having excellent viewing angle characteristics and a high contrast ratio.

In this embodiment, the second liquid crystal layer disposed at the upper position has a right helical structure and the first liquid crystal layer disposed at the lower position has a left helical structure. However, the opposite combination may be used.

Figure 3:
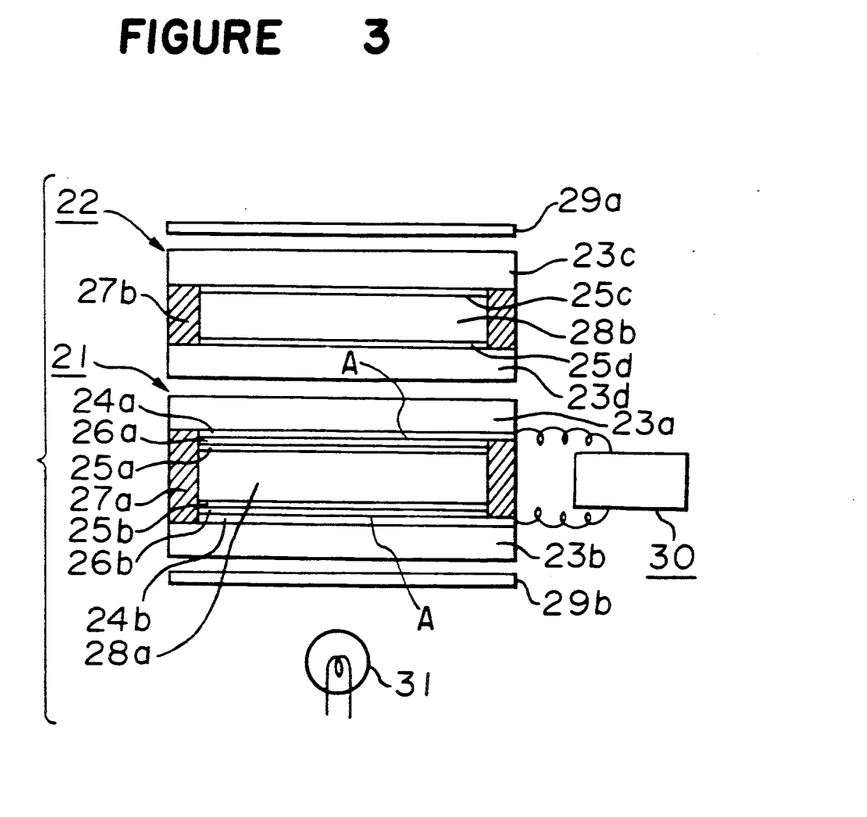
FIGS. 3 and 4 are respectively longitudinal cross-sectional views of embodiments of the liquid crystal display device of the present invention.
Figure 4:
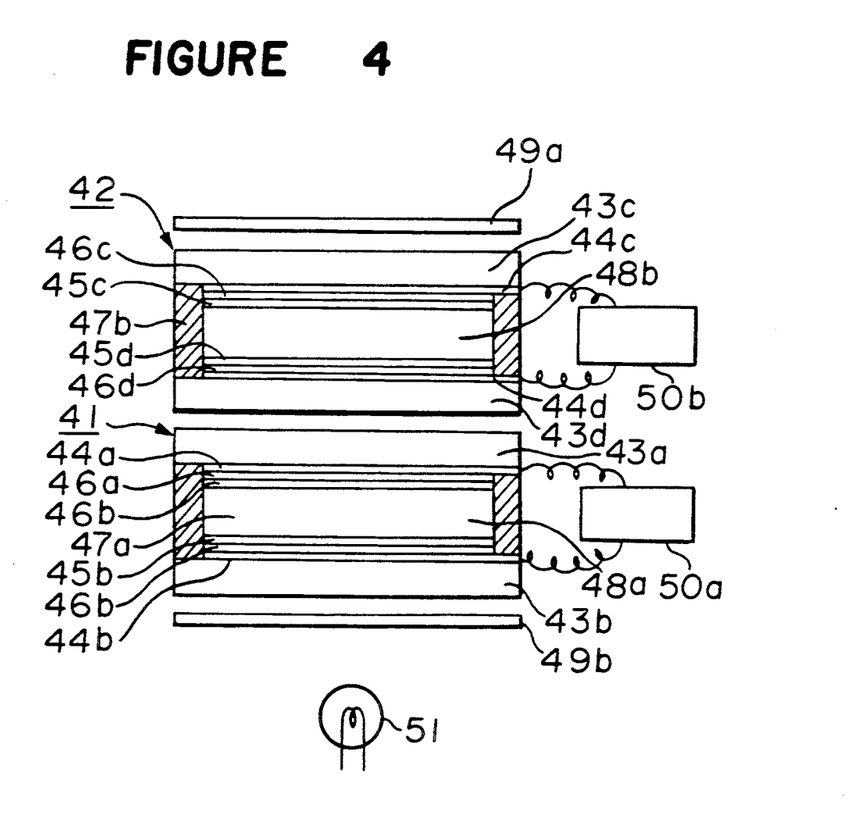

FIGS. 3 and 4 show preferred embodiments in cross-section of the present invention.

FIG. 3 is an embodiment of the liquid crystal display device in which no electrode is provided in the second liquid crystal layer.

In FIG. 3, a reference numeral 21 designates a first liquid crystal cell having a twist angle of 200°-300° which is adapted to receive a voltage to perform the display of characters and so on, a numeral 22 designates a second liquid crystal cell having a reverse twist structure to compensate elliptically polarized light, numerals 23a, 23b designate substrates made of plastics, glass and so on to constitute the first liquid crystal cell, numerals 24a, 24b designate transparent electrodes made of a material such as ITO ($In_2O_3$-$SnO_2$), $SnO_2$ and so on which is formed on the inner surface of the substrates, numerals 25a, 25b designate aligning layers formed by rubbing a film such as polyimide film, a polyamide film and so on, or by an oblique vapor deposition of SiO, numerals 26a, 26b designate insulating layers made of a material such as $TiO_2$, $SiO_2$, $Al_2O_3$ and so on which are formed, if necessary, between the transparent electrode and the aligning layer to avoid a short circuit which may be caused between the substrates, a numeral 27a designates a sealing material to seal a space of the circumferential parts of the two substrates 24a, 24b, and a numeral 28a designates a nematic liquid crystal having positive dielectric anisotropy which is enclosed by the substrates and the sealing material. In the first liquid crystal cell, the aligning directions of the aligning layers 25a, 25b and the pitch of liquid crystal molecules are so arranged as to provide a twist angle of 200°-300°.

Numerals 23c, 23d designate a pair of substrates for the second liquid crystal cell, numerals 25c, 25d designate aligning layers, a numeral 27b designates a sealing material and numeral 28 designates a nematic liquid crystal enclosed by the substrates and the sealing material. The aligning directions of the aligning layers 25c, 25d and the pitch of the liquid crystal molecules are so arranged as to provide the direction of twist opposite the first liquid crystal layer and the same twist angle as the first liquid crystal layer. In this embodiment, since no-voltage is applied to the second liquid crystal cell, it is unnecessary to provide an acute threshold value characteristics of liquid crystal, and therefore, a high tilt angle as required in the ordinary super twist liquid crystal display device is not required.

A treatment of aligning is made in such a manner that the axial direction of the liquid crystal molecules in the first liquid crystal cell at the side of the second liquid crystal cell and the axial direction of the liquid crystal molecules in the second liquid crystal cell at the side of the first liquid crystal cell are crossed at substantially a right angle.

A pair of polarizing plates 29a, 29b are arranged at the outside of the two liquid crystal layers so that the angle of the intersection of the polarization axes of the pair of polarizing plates is in a range of 60°-120°, preferably, at substantially a right angle. It is especially preferable that the direction of the polarization axis of the polarizing plate 29a disposed at the viewer's side, i.e. at the upper side in this Figure is displaced by 30°-60° with respect to the axial direction of the liquid crystal molecules on the aligning layer 25c which is closest to the viewer. In this embodiment, since the direction of the polarization axes of the pair of polarizing plates are crossed substantially perpendicularly, the direction of the polarization axis of the polarizing plate 29b at the back side is displaced by an angle 30°-60° with respect to the axial direction of the liquid crystal molecules on the aligning layer 25b which is most remote from the viewer.

A numeral 30 designates a driving circuit to apply a voltage to the first liquid crystal cell and a numeral 31 designates a light source.

In this embodiment, the transparent electrodes and the insulation layers are not formed and the driving circuit is not provided because no voltage is applied to the second liquid crystal cell.

In this embodiment, since no voltage is applied to the second liquid crystal layer when the device is used, a value $\Delta n_2 \cdot d_2$ of the second liquid crystal layer is only made substantially equal to a value $\Delta n_1 \cdot d_1 \cdot \cos^2(\theta x_1)$ of the first liquid crystal layer when a non-selected voltage (for a negative display) or a selected voltage (for a positive display) is applied to the layer.

FIG. 4 shows another embodiment in which electrodes are provided for the second liquid crystal layer to apply a voltage when the liquid crystal display device is used.

In FIG. 4, a reference numeral 41 designates a first liquid crystal cell having a twist angle of 200°-300° which is adapted to receive a voltage to display characters and so on, a numeral 42 designates a second liquid crystal cell having a reverse twist structure to compensate elliptically polarized light, numerals 43a, 43b designate substrates made of a material such as plastics, glass and so on which constitute the first liquid crystal cell, numerals 44a, 44b designate transparent electrodes made of a material such as ITO ($In_2O_3$-$SnO_2$), $SnO_2$ and so on which are formed on the inner surface of the substrates, numerals 45a, 45b designates aligning layers formed by rubbing a film made of a material such as polyimide, polyamide and so on or by an oblique vapor deposition of a material such as SiO and so on, numerals 46a, 46b designate insulating layers of a material such as $TiO_2$, $SiO_2$, $Al_2O_3$ and so on which are formed, if necessary, between the transparent electrode and the aligning layer to avoid a short circuit caused between the substrates, a numeral 47a designates a sealing material to seal a space between the peripheral portion of the two substrates 44a, 44b, and a numeral 48a designates a nematic liquid crystal having positive dielectric anisotropy sealed by the substrates and the sealing material. The aligning directions of the aligning layers 45a, 45b and the pitch of the liquid crystal are arranged to provide a twist angle of 200°-300°.

Numerals 43c, 43d designate substrates for a second liquid crystal cell, numerals 44c, 44d designate transparent electrode in a sheet-like form to be attached to the substantially entire part of the surface of the substrates, numerals 45c, 45d designate aligning layers, numerals 46c, 46d designate insulating layers which are provided if necessary, a numeral 47b designates a sealing material and a numeral 48b designates a nematic liquid crystal enclosed by the substrates and the sealing material, the nematic liquid crystal containing a suitable amount of dye and having positive dielectric anisotropy. The aligning directions of the aligning layers 45c, 45d and the pitch of liquid crystal are so arranged to provide the direction of twist opposite the first liquid crystal layer and the same twist angle as in the first liquid crystal layer.

Any kind of dye may be used as long as it is well soluble in the liquid crystal since it is sufficient that the dye compensates color only at white portion.

In this embodiment, the second liquid crystal cell does not undergo frequent turning on-off operations of a voltage. Therefore, when the threshold value characteristics of the liquid crystal is acute, a margin of voltage to adjust the value $\Delta n_2 \cdot d_2 \cdot \cos^2(\theta x_2)$ becomes small. Accordingly, it is not always necessary to provide a high tilt angle as required in the ordinary super twisted liquid crystal display device.

A treatment of aligning is made in such a manner that the axial direction of the liquid crystal molecules in the first liquid crystal cell at the side of the second liquid crystal cell and the axial direction of the liquid crystal molecules in the second liquid crystal cell at the side of the first liquid crystal cell are crossed at substantially a right angle.

A pair of polarizing plates 49a, 49b are arranged outside the two liquid crystal layers so that the angle of intersection of the polarization axes of the polarizing plates is in a range of 60°–12020, preferably substantially a right angle. In this embodiment, it is preferable that the direction of the polarization axis of the polarizing plate 49a disposed at the viewer's side i.e. at the upper side in this Figure is 30°–60° displaced from the axial direction of the liquid crystal molecules on the aligning layer 45c which is closest to the viewer. In this case, the polarization axes of the pair of polarizing plates are crossed at substantially a right angle, and the direction of the polarization axis of the rear polarizing plate 49b is also 30°–60° displaced from the axial direction of the liquid crystal molecules on the aligning layer 45b which is most remote from the viewer.

Numerals 50a, 50b respectively designate a first liquid crystal cell and a driving circuit to apply a voltage to the second liquid crystal cell, and a numeral 51 designates a light source.

In this embodiment which is adapted to apply a voltage to the second liquid crystal layer when the device is used, a value $\Delta n_2 \cdot d_2 \cdot \cos^2(\theta x_2)$ of the second liquid crystal layer at the time of applying the voltage is made substantially equal to a value $\Delta n_1 \cdot d_1 \cdot \cos^2(\theta_{21})$ of the first liquid crystal layer at the time of application of a selected voltage when a positive display system is used. On the other hand, when a negative display system is used, the value $\Delta n_2 \cdot d_2 \cdot \cos^2(\theta x_2)$ of the second liquid crystal layer is made substantially equal to a value $\Delta n_1 \cdot d_1 \cdot \cos^2(\theta_{11})$ of the first liquid crystal layer at the time of application of a non-selected voltage.

The voltage applied to the second liquid crystal layer can be one to equalize the product of a value $\Delta n \cdot d$ and a value $\cos^2(\theta x)$ In practice, it is preferable that the voltage is adjusted for each liquid crystal display device because there is fluctuation in cells when the cells are manufactured.

In the present invention, the substrates constituting the liquid crystal cell may be optically isotropic transparent substrate. Glass, plastic resin may be used for the substrate.

Electrodes are attached to the substrates in the first liquid crystal cell which displays characters and so on. By applying a voltage across desired electrodes to turn on or off the liquid crystal, a display is effected. Transparent electrodes made of a material such as ITO, $SnO_2$ and so on are usually used and lead wires having a low resistance made of a at least material selected from the group consisting of Al, Cr and Ti and are used in combination of the electrodes if necessary. As a typical example, there is a dot matrix liquid crystal display device in which a number of line electrodes are provided. Specifically, 640 stripe electrodes are formed in one substrate and 400 stripe electrodes are formed in the other substrate so that they cross at a right angle, whereby a display of 640×400 dots can be obtained.

In order to align the liquid crystal molecules, a known method such as a rubbing method, an oblique vapor deposition method may be used. If necessary, a insulating layer made of an inorganic material such as $SiO_2$, $TiO_2$, $Al_2O_3$ and so on which prevents a short circuit from occuring and/or a layer of an organic material such as polyimide, polyamide may be formed on the electrode before the aligning treatment.

In accordance with the present invention, since a display close to a monochrome display can be obtained, it is possible to obtain a colored display with use of a color filter. Particularly, it is possible to obtain a full-colored gray scale because a high contrast ratio is possible even by a high duty driving. Accordingly, the liquid crystal display device is applicable to a liquid crystal TV.

There takes place no parallax in display depending on different viewing angle if the color filter is formed on the inner surface of the cell. Accordingly, a further fine color display is possible. The color filter may be formed at the lower side of the electrode or at the upper side of the electrode.

The liquid crystal display device of the present invention provides a bright display, and it is applicable to a transmitting type or a reflecting type.

In the above-mentioned embodiment, the second liquid crystal layer is arranged at the upper portion. However, it may be arranged at the lower portion.

In the above-mentioned embodiment, four substrates are used to constitute two liquid crystal layers. However, two substrates disposed in the middle may be replaced by a single substrate.

When it is necessary to display with complete black and white tone, a color filter which compensates color may be additionally used. Further, an illuminating means having a specific wavelength distribution may be used.

The liquid crystal display device of the present invention is often used for a reflecting type because a black display on a white background is effected in the case of a positive display. However, it may be used for a transmitting type. On the other hand, the transmitting type display device is often used because a white display on a black background is effected in the case of a negative display. However, it may be used for the reflecting type.

When the liquid crystal display device is used for the transmitting type, a contrast ratio of display can be increased by covering the background area other than picture elements with a light shielding layer such as a printed layer. Further, an inverse driving system can be used by using a light shielding layer and by applying a selected voltage to a non-display area.

In the present invention, various techniques as used in the ordinary liquid crystal display device can be utilized as far as the effect of the present invention is performed.

The principle of the operations of the present invention can be considered as follows although it is not entirely clear.

When a selected voltage is applied to the first liquid crystal layer and linearly polarized light which is passed through the polarizing plate is transmitted through the first liquid crystal layer, elliptically polalized light is obtained. When the elliptically polarized light is transmitted through the second liquid crystal layer, it approaches a condition of the linearly polarized light which is the same condition as the light being before incidence into the first liquid crystal layer. In this case, the construction of the liquid crystal display device is such that the helical sense of the first liquid crystal layer is opposite that of the second liquid crystal layer, but they have substantially the same the twist angle, and a value $\Delta n_1 \cdot d_1 \cdot \cos^2(\theta_{21})$ of the first liquid crystal layer obtained when a selected voltage is applied thereto at the time of multiplexing driving is made substantially equal to a value $\Delta n_2 \cdot d_2 \cdot \cos^2(\theta x_2)$ of the second liquid crystal layer when the device is used Accordingly, the incident light is returned to the linearly polarized light in a complete form.

The above-mentioned effect obtained by using the two layer structure of the present invention is based on the fact that optical anisotropy is lost in apparent view when thin layers of optically uniaxial media are laminated so that their optical axes are crossed at a right angle. Thus, when the polarization axis of a polarizing plate at the side of light coming out is arranged with respect t the polarization axis of the polarizing plate at the light incident side so that they cross at a right angle, a transmitting light is absorbed to thereby provide black tone. On the other hand, when a non-selected voltage is applied to the first liquid crystal layer or no voltage is applied to the background area, the orientation of the liquid crystal molecules in the first liquid crystal layer is changed. While light passes through the polarizing plate at side of light coming out and the first and second liquid crystal layers, the color of light is compensated by the second liquid crystal layer. Accordingly, the area applied with the non-selected voltage (a segment area which is electrically non-selected) or the background area shows white tone, with the result that a positive display having a monochrome color is obtainable.

In the same manner as above, a negative display having a monochrome color can be obtained by equalizing a value $\Delta n_1 \cdot d_1 \cdot \cos^2(\theta_{11})$ in the first liquid crystal layer obtained when a non-selected voltage is applied to it at the time of multiplexing driving with a value $\Delta n_2 \cdot d_2 \cdot \cos^2(\theta x_2)$ in the second liquid crystal layer when the display device is used.

Further, in the present invention, a display having excellent viewing angle characteristics can be obtained by determining the value $\Delta n_1 \cdot d_1$ of the liquid crystal of the first liquid crystal layer to be in a range of 0.7 μm-2.0 μm.

While the conventional super twisted liquid crystals display device provides a good contrast only in combination of specific colors such as yellowish green and dark blue, bluish purple and pale yellow and so on, in the present invention, it is possible to obtain a display of clear and bright monochrome tone and a high contrast ratio with excellent viewing angle characteristics.

In the present invention, dye is incorporated in the second liquid crystal layer to effect color compensation, and a display by the multiplexing driving is effected by the first liquid crystal layer. The liquid crystal display device of the present invention has the same multiplexing characteristics as the super twisted liquid crystal display device. Further, a clear and bright monochrome display can be obtained as described before. Accordingly, it is possible to realize a high density multicolor liquid crystal display device by arranging a fine color filter having three primary colors: red, green, blue at an appropriate position such as inner surface of the cell.

The liquid crystal display device of the present invention is preferably used for a display element for a personal computer, a word processor, a work station. The display device of the present invention is also applicable to various display device of a monochrome type or a color type such as a liquid crystal TV, a fishing soner, a rader, an oscilloscope and dot matrix display devices.

EXAMPLE 1

As a first substrate, an ITO transparent electrode was formed on a glass substrate into a stripe form by patterning. Then, an insulating layer of $SiO_2$ was formed by a vapor deposition method. An overcoating layer of polyimide was formed by a spin-coating method followed by rubbing it to form aligning layer.

As a second substrate, an ITO transparent electrode was formed on a glass substrate into a stripe form by patterning so that the direction of the transparent electrode was perpendicular to the stripe-formed transparent electrode of the first substrate. Then, an insulating layer of $SiO_2$ was formed on the transparent electrode. An overcoating layer of polyimide was formed on the insulating layer followed by rubbing it to form an aligning layer. The covercoating layer was subjected to a rubbing operation to form an intersecting angle of 60° to the direction of rubbing in the first substrate. On the back surface where no electrode was formed, an overcoating layer of polyimide, was formed which was subjecting to rubbing to form an aligning layer so that the rubbing direction was perpendicular to the rubbing direction of the front layer.

As a third substrate, a glass substrate without any electrode was used. An overcoating layer of polyimide was formed followed by rubbing the layer to form an aligning layer.

The circumferential parts of the three substrates were sealed by a sealing material to thereby form two layers in which liquid crystal was to be filled.

Nematic liquid crystal having positive dielectric anisotropy wa filled in the first liquid crystal layer having the stripe-like patterning and the opposed ITO electrodes. The same nematic liquid crystal but having the opposite helical sense of twist angle was filled in the second liquid crystal layer without having electrodes, and then the injection ports were closed.

In the liquid crystal in the second liquid crystal layer, an azo series dye G-241 (manufactured by Nippon Kanko Shikiso K.K.), an anthraquinone series dye G-375 (by Nippon Kanko Shikiso K.K.), LSB-278 (by Mitsubishi Kasei Corporation), LSB-335 (by Mitsubishi Kasei Corporation) were incorporated in respective amounts of 0.2 wt%, 0.5 wt%, 0.5 wt% and 0.5 wt% to thereby show reddish purple as a whole.

In this case, the first liquid crystal layer had a 240° twisted right helical structure and the second liquid crystal layer had a 240° twisted left helical structure. The value $\Delta n_1 \cdot d_1$ of the first liquid crystal layer was 1.00 μm and the value $n_2 \cdot d_2$ of the second liquid crystal layer was 0.95 μm.

A pair of polarizing plates were arranged at both sides of the liquid crystal cells so that their polarization axes crossed at a right angle and the polarization axis of the polarizing plate disposed at the viewer's side was displaced by 45° in the clockwise direction with respect to the longer axis of the liquid crystal molecules closest to the viewer.

A back light with a cold cathode tube was disposed on the opposite side of the viewer's side of the liquid crystal display device and display device was driven at a duty of 1/200 and a bias of 1/15. As a result, a clear monochrome display having excellent viewing angle characteristics could be obtained.

In this case, the segment corresponding to a non-selected voltage area showed black tone and the segment corresponding to a selected voltage area showed white tone. This is a so-called a negative display. The contrast ratio was about 30.

Voltage-transmittance characteristics was measured by applying a voltage having a rectangular waveform and 100 Hz to the first liquid crystal layer of the liquid crystal display device. It was found that the transmittance under the condition of application of a selected voltage was 26% which was fairly higher than 19% which was obtained by measuring an OMI device capable of showing a display close to a monochrome display. This revealed that the liquid crystal display device of this embodiment could show a bright display.

As a Comparative Example, the same liquid crystal display device as being used in Example 1 was prepared except that liquid crystal without containing any dye was used for the second liquid crystal layer. When the display device was driven in the same manner as Example 1, the same display as Example 1 was obtained except that a color having a yellowish color was shown. It was found that the present invention rendered a display to be colorless and provided a monochrome display having excellent viewing angle characteristics.

EXAMPLE 2

The same liquid crystal display device as Example 1 was prepared except that the first liquid crystal layer had a 240° twisted left helical structure and the second liquid crystal layer had a 240° twisted right helical structure. The display device was driven in the same manner as Example 1. As a result, the same monochrome display as Example 1 could be obtained.

EXAMPLE 3

The same liquid crystal display device as Example 2 was prepared except that an azo series dye G-241 (reddish purple, manufactured by Nippon Kanko Shikiso K.K.) was incorporated in the second liquid crystal layer at an amount of 0.08 wt%; the value $n_1 \cdot d_1$ of the first liquid crystal layer was 0.86 μm and the value $n_2 \cdot d_2$ of the second liquid crystal layer was 0.81 μm.

A back light with a cold cathode tube was disposed on the rear side of the liquid crystal display device and the display device was driven at a duty of 1/200 and a bias of 1/15. The same viewing angle characteristics, contrast ratio and monochrome display as Example 1 could be obtained.

EXAMPLE 4

The same liquid crystal display device as Example 2 was prepared except that an azo series dye G-204 (reddish purple, manufactured by Nippon Kanko Shikiso K.K.) was incorporated in the second liquid crystal layer at an amount of 0.09 wt%; the value $\Delta n_1 \cdot d_1$ of the first liquid crystal layer was 0.82 μm and the value $\Delta n_2 \cdot d_2$ of the second liquid crystal layer was 0.77 μm.

A back light with a cold cathode tube was disposed on the rear side of the liquid crystal display device. The display device was driven at a duty of 1/200 and a bias of 1/15. As a result, the same viewing angle characteristics, contrast ratio and monochrome display as Example 1 could be obtained.

EXAMPLE 5

The same liquid crystal display device as Example 1 was prepared except that sheet-like transparent electrodes were formed on both surfaces of the second liquid crystal layer; the value $\Delta n_1 \cdot d_1$ of the first liquid crystal layer was 0.87 μm and the value $\Delta n_2 \cdot d_2$ of the second liquid crystal layer was 1.00 μm.

A voltage was applied to the second liquid crystal layer in the actuation of the liquid crystal display device, and the value $\Delta n_1 \cdot d_1 \cdot \cos^2 (\theta_{11})$ obtained when a non-selected voltage was applied to the first liquid crystal layer was made equal to the value $\Delta n_2 \cdot d_2 \cdot \cos^2 (\theta_{12})$ obtained when a voltage was applied to the second liquid crystal layer.

As a result, the same monochrome display as Example 1 was obtained. A voltage to be applied to the second liquid crystal layer was increased, and the value $\Delta n_1 \cdot d_1 \cdot \cos^2 (\theta_{21})$ obtained when a selected voltage was applied to the first liquid crystal layer was made equal to the value $\Delta n_2 \cdot d_2 \cdot \cos^2 (\theta_{22})$ obtained when a voltage is applied to the second liquid crystal layer. As a result, the nature of a negative display was reversed to a positive display, and a positive type monochrome display having a broad viewing angle characteristics was obtained.

EXAMPLES 6 and 7

The same liquid crystal display devices as Examples 1 and 5 were respectively prepared except that the twist angle in the Examples 1 and 5 were respectively 260°. The display devices were driven in the same manner as the Examples. As a result, the same monochrome display as Example 1 was obtained except that a contrast ratio was more or less increased.

EXAMPLES 8 and 9

The same liquid crystal display devices as Examples 1 and 5 were respectively prepared except that four substrates were used to interpose the liquid crystal layers as in Examples 1 and 5 by separate substrates. The display devices were driven in the same manner as the Examples. As a result, the same monochrome display as Example was obtained except that a contrast ratio was more or less decreased.

EXAMPLE 10

The same liquid crystal display device as Example 1 was prepared except that a stripe-form three-colored color filter layer A as shown, for example, in FIG. 3 was formed on the electrodes. The display device was driven in the same manner as Example 1. As a result, a full-colored gray scale display was possible.

Thus, in accordance with the present invention, a monochrome display having a high contrast ratio can be provided and a clear positive or negative type display having high quality can be provided in comparison with conventional super twisted liquid crystal display device.

The liquid crystal display device of the present invention has the same multiplexing characteristics as the conventional super twisted liquid crystal display device and shows excellent viewing angle characteristics.

The nature of a near monochrome display allows a combination with a color filter, whereby a colorful display becomes possible. In particular, it is possible to obtain a multicolor display or full color display by arranging color filters of red, green, blue for each picture element; thus, a variety of applications are possible.

Since the liquid crystal display device of the present invention provides a clear display while it is possible to effect a monochrome display, it is applicable to a transmitting type and a reflecting type display. It has a broad range of applications. Further, according to the present invention, various applications are possible as far as the effect of the present invention is not impaired.

We claim:

1. A liquid crystal display device comprising:
   a first liquid crystal layer of a nematic liquid crystal having positive dielectric anisotropy and including a chiral material which is interposed between a pair of substrates each having an aligning layer which are arranged substantially in parallel;
   a voltage applying means to apply a voltage across transparent electrodes of said pair of substrates which interpose said first liquid crystal layer therebetween;
   a second liquid crystal layer of a nematic liquid crystal including a chiral material which is interposed between a pair of substrates each having an aligning layer, said second liquid crystal layer being adjacent to said first liquid crystal layer; and
   a pair of polarizing plates arranged outside said first and second liquid crystal layers, wherein:
   said second liquid crystal layer contains dye for color compensation;
   the product $\Delta n_1 \cdot d_1$ of an anisotropy of refractive index $\Delta n_1$ of liquid crystal in said first liquid crystal layer and a thickness of the first liquid crystal layer $d_1$ is in a range of 0.7-2.0 μm;
   an axial direction of liquid crystal molecules of said first liquid crystal layer in an area close to said second liquid crystal layer is crossed at substantially a right angle to an axial direction of liquid crystal molecules of said second liquid crystal layer in an area close to said first liquid crystal layer;
   a twist angle of the liquid crystal molecules in said first liquid crystal layer is in a range of 200°–300°;
   a twist angle of the liquid crystal molecules in said second liquid crystal layer is substantially the same as the first liquid crystal layer but a helical sense thereof is opposite; and
   an angle of intersection of the polarization axes of said pair of polarizing plates arranged outside said two liquid crystal layers is in a range of 60°–120°.

2. The liquid crystal display device according to claim 1, wherein said pair of substrates interposing said second liquid crystal layer therebetween are respectively provided with a transparent electrode which extends on its entire surface so as to correspond to a display area of said first liquid crystal layer, and a voltage applying means is disposed to apply a voltage across said transparent electrodes of the substrates for the second liquid crystal layer, whereby the voltage is applied to said second liquid crystal layer when the liquid crystal display device is driven.

3. The liquid crystal display device according to claim 2, wherein the product $\Delta n_2 \cdot d_2$ (which is the product of an anisotropy of refractive index of said second liquid crystal layer and a thickness of the second crystal layer of said second liquid crystal layer in a time of non-voltage application is made greater than the product $\Delta n_1 \cdot d_1 \cdot \cos^2(\theta_{11})$ of said value $\Delta n_1 \cdot d_1$ (as defined before) and a value $\cos^2(\theta_{11})$ (which is the second power of a cosine of $\theta_{11}$ (which is a mean value of a tilt angle is average of the liquid crystal molecules of the first liquid crystal layer to a plane in parallel to said first liquid crystal layer when a non-selected voltages is applied to said first liquid crystal layer)), and by applying a voltage across the transparent electrodes of said second liquid crystal layer when the display device is used, the product $\Delta n_2 \cdot d_2 \cdot \cos^2(\theta x_2)$ of a value $\Delta n_2 \cdot d_2$ (as defined before) of said second liquid crystal layer and a value $\cos^2(\theta x_2)$ (which is the second power of a cosine of $\theta x_2$ which is a mean value of a tilt angle $\theta_2$ of the liquid crystal molecules of the second liquid crystal layer to a plane in paralleled to said second liquid crystal layer) is substantially equal to the product $\Delta n_1 \cdot d_1 \cdot \cos^2(\theta_{11})$ (as defined before) when a non-selected voltage is applied to said first liquid crystal layer.

4. The liquid crystal display device according to claim 2, wherein the product $\Delta n_2 \cdot d_2$ (which is the product of an anisotropy of refractive index of said second liquid crystal layer and a thickness of the second crystal layer) of said second liquid crystal layer in a time of non-voltage application is made greater than the product $\Delta n_1 \cdot d_1 \cdot \cos^2(\theta_{11})$ (which is the second power of a cosine of $\theta_{11}$ (which is a mean value of a tilt angle in average of the liquid crystal molecules of the first liquid crystal layer to a plane in parallel to said first liquid crystal layer when a non-selected voltage is applied to said first liquid crystal layer)), and by applying a voltage across the transparent electrodes of said second liquid crystal layer when the display device is used, the product $\Delta n_2 \cdot d_2 \cdot \cos^2(\theta x_2)$ of a value $\Delta n_2 \cdot d_2$ (as defined before) of said second liquid crystal layer and a value $\cos^2(\theta x_2)$ (which is the second power of a cosine of $\theta x_2$ which is a mean value of a tilt angle $\theta_2$ of the liquid crystal molecules of the second liquid crystal layer to a plane in parallel to said second liquid crystal layer) is substantially equal to the product $\Delta n_1 \cdot d_1 \cdot \cos^2(\theta_{11})$ (as defined before) when a selected voltage is applied to said first liquid crystal layer.

5. The liquid crystal display device according to claim 1 wherein no voltage is applied to said second liquid crystal layer when it is used.

6. The liquid crystal display device according to claim 5, wherein the product $\Delta n_2 \cdot d_2 \cdot \cos^2(\theta x_2)$ of a value $\Delta n_2 \cdot d_2$ (which is the product of an anisotropy of refractive index of said second liquid crystal layer and a thickness of the second crystal layer) and a value $\cos^2(\theta x_2)$ (which is the second power of a cosine of $\theta x_2$ which is a mean value of a tilt angle $\theta_2$ of the liquid crystal molecules of the second liquid crystal layer to a plane in parallel to said second liquid crystal layer when the display device is used) is substantially equal to the product $\Delta n_1 \cdot \cos^2(\theta_{11})$ of said value $\Delta n_1 \cdot d_1$ (as defined before) and a value $\cos^2(\theta_{11})$ (which is the second power of a cosine of $\theta_{11}$ (which is a mean value of a tilt angle in average of the liquid crystal molecules of the first liquid crystal layer to a plane in parallel to said first liquid crystal layer when a non-selected voltage is applied to said first liquid crystal layer)).

7. The liquid crystal display device according to claim 5, wherein the product $\Delta n_2 \cdot d_2 \cdot \cos^2(\theta x_2)$ of a value $\Delta n_2 \cdot d_2$ (which is the product of an anisotropy of refractive index of said second liquid crystal layer and a thickness of the second crystal layer) and a value $\cos^2(\theta x_2)$ (which is the second power of a cosine of $\theta x_2$ which is a mean value of a tilt angle $\theta_2$ of the liquid crystal molecules of the second liquid crystal layer to a plane in parallel to said second liquid crystal layer when the display device is used) is substantially equal to the product $\Delta n_1 \cdot d_1 \cdot \cos^2(\theta_{21})$ of said value $\Delta n_1 \cdot d_1$ (as defined before) and a value $\cos^2(\theta_{21})$ which is the second power of a cosine of $\theta_{21}$ (which is a mean value of a tilt angle in average of the liquid crystal molecules of the first liquid crystal layer to a plane in parallel to said first liquid crystal layer when a selected voltage is applied to said first liquid crystal layer)).

8. The liquid crystal display device according to claim 5, wherein said product $\Delta n_2 \cdot d_2$ of the second liquid crystal layer is 1%-20% smaller than said product $\Delta n_1 \cdot d_1$ of the first crystal layer.

9. The liquid crystal display device according to claim 5, wherein said product $\Delta n_2 \cdot d_2$ of the second liquid crystal layer is 25%-90% smaller than said product $\Delta n_1 \cdot d_1$ of the first crystal layer.

10. The liquid crystal display device according to claim 1, wherein said product $\Delta n_1 \cdot d_1$ of the first liquid crystal layer is 0.8 $\mu$m-1.5 $\mu$m.

11. The liquid crystal display device according to claim 1, wherein a nematic to isotropic phase transfer temperature of the first liquid crystal layer is made substantially equal to a nematic to isotropic phase transfer temperature of the second liquid crystal layer.

12. The liquid crystal display device according to claim 1, wherein a color filter is formed juxtaposed to each of the electrodes.

13. A liquid crystal display device comprising:

a first liquid crystal layer of a nematic liquid crystal having positive dielectric anisotropy and including a chiral material which is interposed between a pair of substrates each having an aligning layer which are arranged substantially in parallel;

a voltage applying means to apply a voltage across transparent electrodes of said pair of substrates which interpose said first liquid crystal layer therebetween;

a second liquid crystal layer of a nematic liquid crystal including a chiral material which is interposed between a pair of substrates each having an aligning layer, said second liquid crystal layer being adjacent to said first liquid crystal layer; and a pair of polarizing plates arranged outside said first and second liquid crystal layers, wherein:

said second liquid crystal layer contains dye;

the product $\Delta n_1 \cdot d_1$ of an anisotropy of refractive index $\Delta n_1$ of liquid crystal in said first liquid crystal layer and a thickness of the first liquid crystal layer $d_1$ is in a range of 0.7-2.0 $\mu$m;

an axial direction of liquid crystal molecules of said first liquid crystal layer in an area close to said second liquid crystal layer is crossed at substantially a right angle to an axial direction of liquid crystal molecules of said second liquid crystal layer in an area close to said first liquid crystal layer;

a twist angle of the liquid crystal molecules in said first liquid crystal layer is in a range of 200°-300°;

a twist angle of the liquid crystal molecules in said second liquid crystal layer is substantially the same as the first liquid crystal layer but a helical sense thereof is opposite; and an angle of intersection of the polarization axes of said pair of polarizing plates arranged outside said two liquid crystal layers is in a range of 60°-120°, wherein 0.1-5 wt% of a dye which absorbs yellow color is incorporated.

14. The liquid crystal display device according to claim 13, wherein said dye is one which shows color-absorbing properties at a long wavelength region of 500 nm or longer and which is incorporated in an amount ranging of 0.1-5 wt%.

* * * * *